United States Patent
Schlenker

[11] Patent Number: 5,163,813
[45] Date of Patent: Nov. 17, 1992

[54] WIND-DRIVEN ENERGY CONVERSION DEVICE

[76] Inventor: John R. Schlenker, Box 275, Rte. 3, Portales, N. Mex. 88130

[21] Appl. No.: 636,590
[22] Filed: Jan. 2, 1991
[51] Int. Cl.$^5$ .............................. F03B 15/06
[52] U.S. Cl. .................... 415/4.2; 415/4.4; 416/132 B; 416/223 R
[58] Field of Search ........... 416/223 A, 223 B, 223 R, 416/14, 132 B, 197 R, 197 A; 415/2.1, 4.1, 4.2, 4.4, 905, 907

[56] References Cited

U.S. PATENT DOCUMENTS

| | | | |
|---|---|---|---|
| 16,346 | 1/1857 | Wentworth | 415/4.1 |
| 50,825 | 11/1965 | Hough . | |
| 232,469 | 9/1880 | Dimock | 415/4.1 |
| 310,237 | 1/1885 | Wegley . | |
| 415,904 | 11/1889 | Duncan | 415/4.4 |
| 619,627 | 2/1899 | Smalley . | |
| 648,442 | 5/1900 | Scott . | |
| 705,922 | 7/1902 | Gran | 415/4.1 |
| 762,315 | 6/1904 | Joyce . | |
| 766,219 | 8/1904 | Clemson . | |
| 1,523,295 | 1/1925 | Ryan . | |
| 1,531,964 | 3/1925 | McHenry . | |
| 1,850,545 | 8/1932 | Gredell | 416/223 B |
| 1,935,097 | 11/1933 | Nelson | 415/4.1 |
| 1,977,949 | 10/1934 | Mobley . | |
| 4,127,356 | 11/1978 | Murphy | 415/4.1 |
| 4,134,708 | 1/1979 | Brauser et al. . | |
| 4,189,280 | 2/1980 | Dohm | 415/2.1 |
| 4,288,704 | 9/1981 | Bosard . | |
| 4,295,783 | 10/1981 | Lebost . | |
| 4,313,710 | 2/1982 | LaFerte | 415/2.1 |
| 4,449,887 | 5/1984 | Mundhenke | 415/2.1 |

FOREIGN PATENT DOCUMENTS 144591 9/1935 Austria ................. 416/132 B

Primary Examiner—Thomas E. Denion
Attorney, Agent, or Firm—Pollock, Vande Sande & Priddy

[57] ABSTRACT

A power-producing windmill is disclosed. A paddle assembly having a central axis is supported for rotation on a frame. Two spaced-apart lateral sides supports the central axis and forms a channel in which the paddle assembly rotates. A pivotal vane is connected on one end of the channel for regulating the amount of air entering the channel is operated such as to regulate the rotational speed of the paddle assembly. A unique paddle configuration is provided which provides first and second wind-capturing cavities for increasing the total energy conversion efficiency of the wind to electromotive energy.

13 Claims, 3 Drawing Sheets

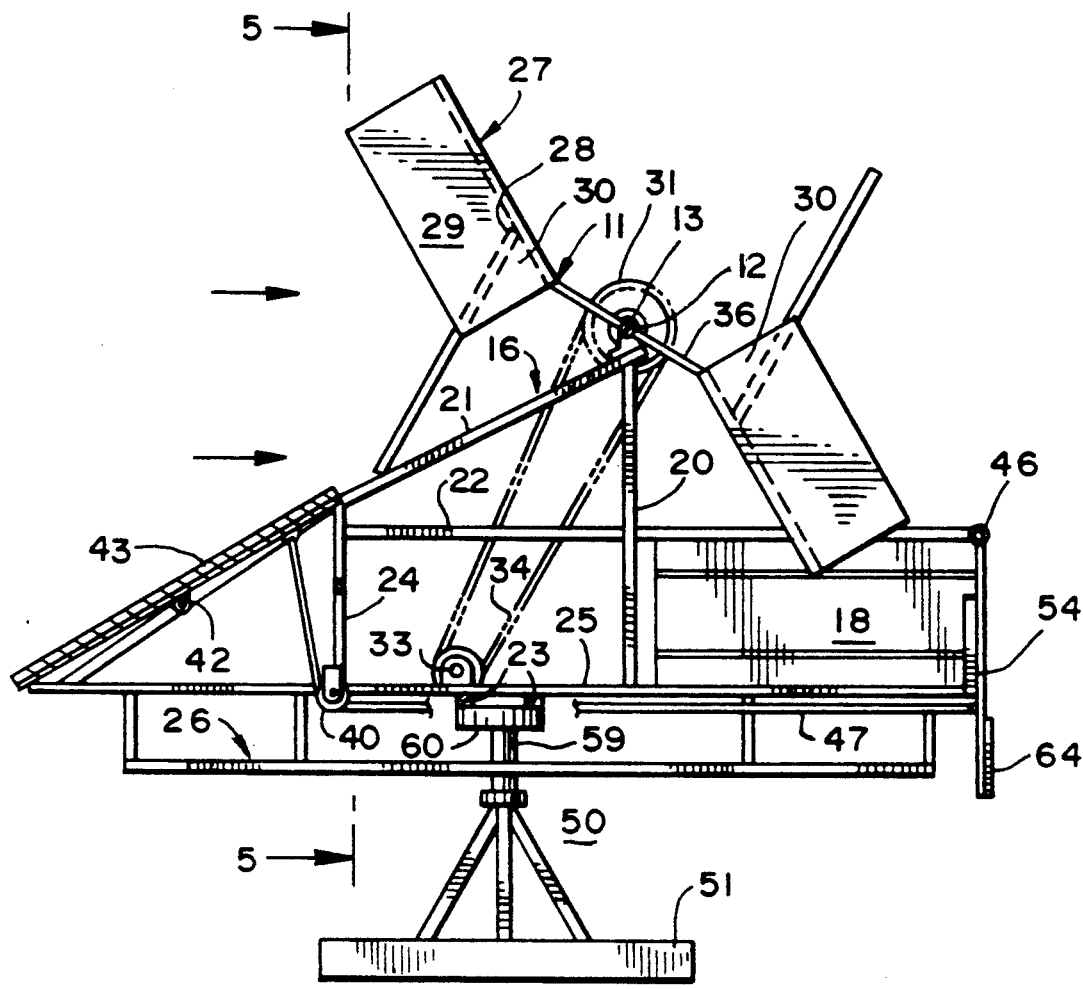
FIG_1
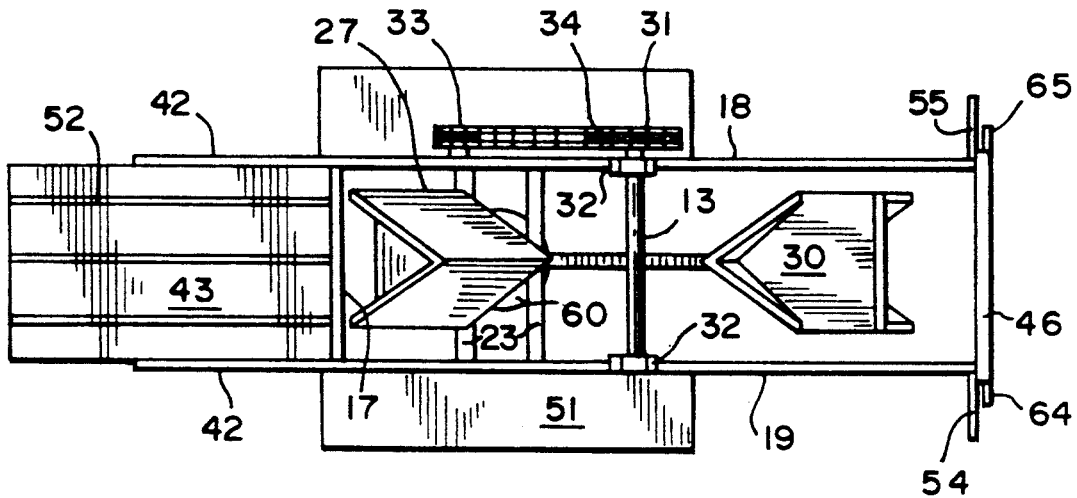
FIG_2

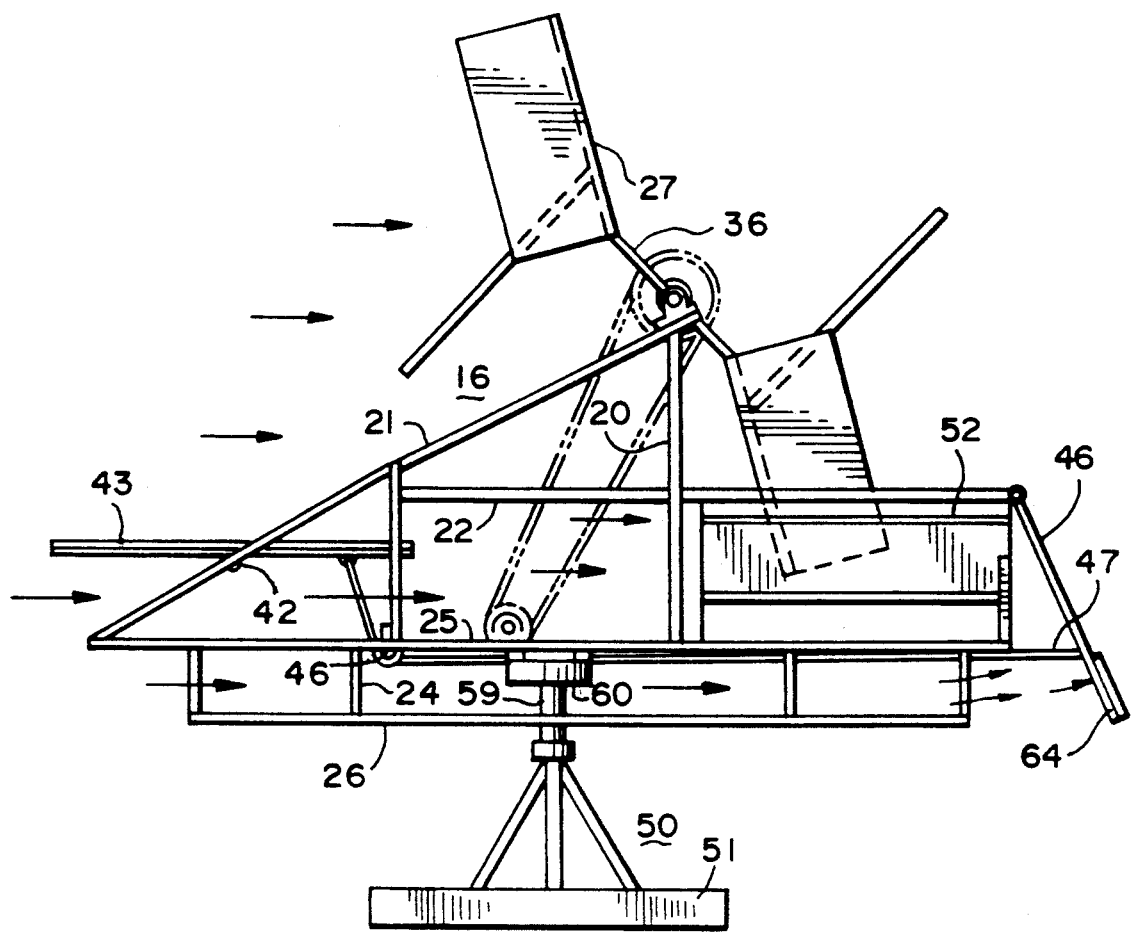
FIG_3
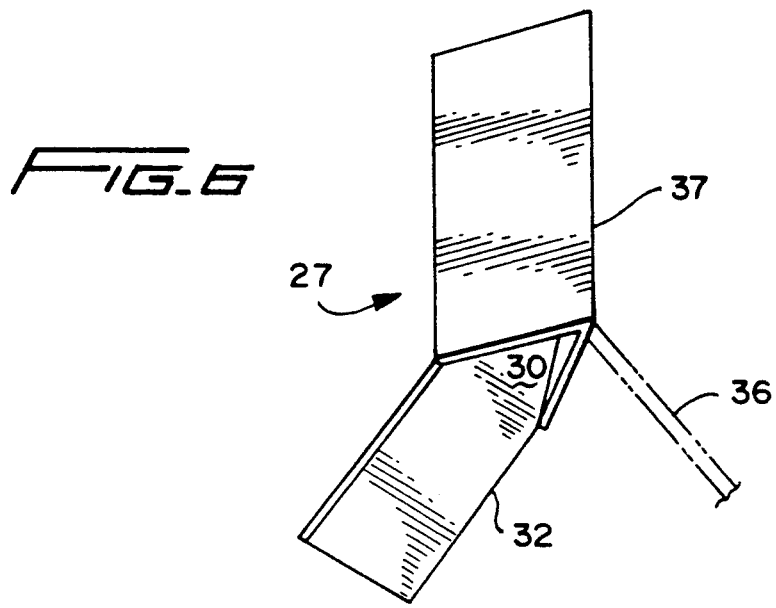
FIG.6

WIND-DRIVEN ENERGY CONVERSION DEVICE

The present invention relates generally to apparatus and methods for extracting energy from the wind. More particularly, it relates to windmills that drive electric generators or other energy converters.

Small-scale wind power generation has been widely employed in the operation of small pumping stations and electrical power stations in remote geographical areas. Although the initial impetus for implementing such devices was the lack of readily available electrical energy, recent interest in these devices has increased in an effort to reduce energy costs.

Windmill technology has progressed to the point where modern airfoil analysis has been employed to design optimum blade structures for extracting the most energy from wind. These blade designs are often developed through computer analysis, permitting a very detailed blade structure to be designed for further increasing the efficiency of these devices.

Although the advanced designs represented by the modern airfoil design have provided increased efficiency, a cost is sustained as a result of the complexity of these systems. Thus, the recovery of the initial capital investment for these systems requires many years of operation.

These windmills generally work in a continuous 24-hour environment under various environmental conditions. A windmill may encounter storm conditions of very high wind, humidity and temperature changes. In all situations, the design of the windmill must be such that it is protected from destruction in high wind conditions, and yet delivers a substantially constant rotational velocity.

The early windmill technology is represented in U.S. Pat. Nos. 64,842 and 310,237. These very early windmills made an effort to control the rotational velocity for various wind conditions. The early designs represented in these references are structurally simple, having construction advantages over the newly-designed aerodynamic blade structures. However, the older windmill systems do not provide the kind of efficiency in wind powered generation which would make them a viable alternative to modern energy conversion devices.

SUMMARY OF THE INVENTION

It is an object of this invention to provide a wind powered energy conversion device that can be built from relatively inexpensive materials.

It is another object of this invention to provide a wind powered energy device for operating in all environmental conditions with minimum maintenance.

It is yet another object of this invention to provide a wind powered energy device having a turbine which rotates at a relatively constant rotational velocity.

These and other objects are provided by a wind powered turbine in accordance with the present invention. The wind powered turbine includes a paddle assembly supporting a plurality of unique paddle members for rotation on a common axle member. The paddle members are connected by radial arms to the axle member for rotation as a result of the incident wind to one or more paddle members.

In a preferred embodiment of the invention, the paddle members have a V-shaped structure with a planar member terminating the V near one end thereof. A first larger wind scoop is provided by the V-shaped member and the terminating planar member. During rotation of each of the paddles, a major force is imparted to the paddle assembly through wind incident to this first cavity.

However, during a portion of the rotational travel of the paddle members, when the first cavity is facing away from the direction of wind, a second smaller cavity provided by the planar member and V-shaped structure, is exposed to the incident wind, thus imparting some force to the paddle assembly when it normally would not be generating any significant power from the wind.

The invention also includes in one embodiment a structure for regulating the rotational speed of the paddle assembly. A frame supporting the common axle member for rotation includes on lateral sides thereof first and second partial side panels for shielding the lateral sides of the paddle assembly during a portion of the paddle assembly rotation in which the paddles are descending. The side panels form a channel in which the paddle assembly rotates. In front of the channel, an adjustable vane member is provided to control the amount of wind which enters the channel. A gate supported at an opposite end of the channel is exposed to the incident wind for adjusting the position of the pivotal vane. Thus, the amount of wind incident to the paddles which are traversing the space between the lateral side panels may be regulated to thus impart a retarding force to the paddle assembly in a high wind condition.

The frame is supported on a rotating pedestal to thus permit the windmill to assume a position aligned with the direction of the incident wind.

BRIEF DESCRIPTION OF THE FIGURES

FIG. 1 illustrates a partial section view of a windmill in accordance with a preferred embodiment.

FIG. 2 is a top view of the windmill of FIG. 1.

FIG. 3 is a second lateral view of the windmill, illustrating the operation of the pivotal vane 43 in response to high wind velocities.

FIG. 6 illustrates the arrangement of the paddles for the paddle assembly.

DESCRIPTION OF THE PREFERRED EMBODIMENT

Figure 4:
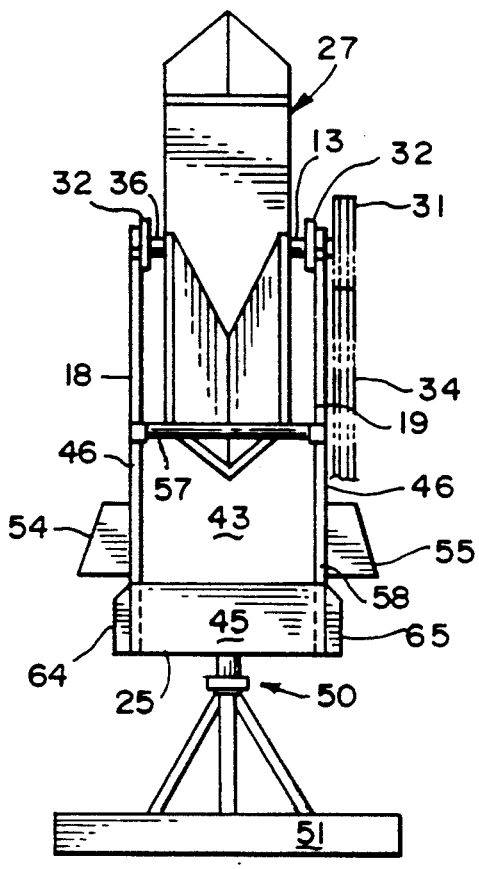
FIG. 4 is a rear view of the operating windmill of FIG. 1.
Figure 5:
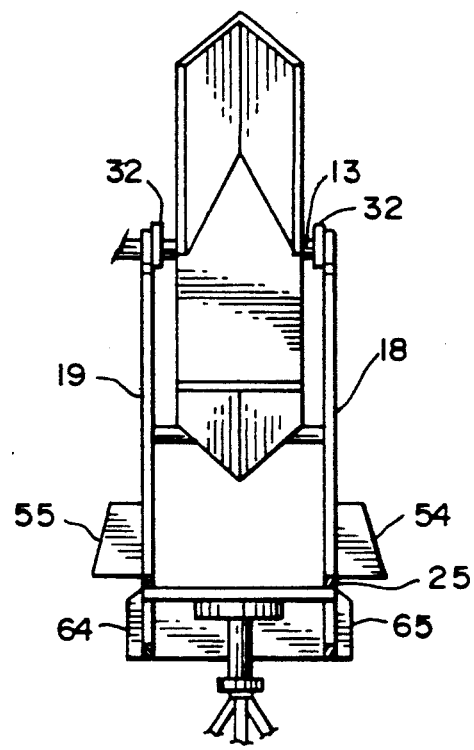
FIG. 5 is a sectional front view AA of the windmill of FIG. 1.

Referring now to the Figures, specifically FIGS. 1-5, there is shown a windmill structure supported for rotation by a pedestal 50. Pedestal 50 is anchored to a cement support 51, and supports a shaft 59. Collar 60 is rotatably connected to the shaft 59.

Supported on the collar 60 is the frame 16 of the windmill, connected by horizontal members 23. The frame 16 supports a pair of side panels 18 and 19, as is shown in FIG. 2. Each of the side panels 18 and 19 form a channel in which a paddle assembly 11, which forms a wind turbine, rotates. The paddles 27 of the paddle assembly 11 are partially shielded by the side panels 18, 19 during the portion of rotation in which they are descending. This portion of the paddle rotation generally produces little power for the windmill. The paddles 27 are connected by radial spokes 36 to a hub 12 which is connected to the axle 13.

The partial section view of FIG. 1 reveals the frame 16. The frame 16 provides structure for mounting each of the side panels 18 and 19 and a pair of vertical supports 20 for an axle 13 of the paddle assembly 11.

The frame 16 may be a welded tubular or angular frame including a pair of spaced apart bottom supports 25, a pair of vertical supports 24, and a pair of vertical supports 20. A pair of sloping members 21 are connected at one end to vertical supports 20, and extend to the bottom supports 25. Two horizontal members 22 extend from vertical supports 24 rearward, connecting to two additional v supports 58 and a horizontal support 57 (see FIG. 4). Side panels 18, 19 extend from the vertical supports 20 rearward, forming a channel in which the paddle assembly may rotate during a portion of their descent. The bottom supports 25 are connected to the collar 60 by a pair of parallel members 23. A gate 45 is hinged by a pair of supports 46 to the horizontal support 57 which extends between parallel vertical supports 58. Wind incident to the extensions 64, 65 of gate 45 will open the rear gate 45 to an extent which depends on the wind strength incident to the gate 45.

Associated with the axle 13 of the paddle assembly is a pair of bearings 32 which support the axle 13 for rotation, with respect to the vertical members 20. Attached to one end of the axle 13 is a pulley 31 which is connected through a belt 34 to a power takeoff pulley 33. The power takeoff pulley 33 may be connected to the energy conversion device such as an electrical generator. This device may be conveniently located on a lower frame 26 connected to bottom supports 25. The electrical generator has a pair of output connections connected by a cable which may be connected to a stationary power station on the ground, through a conventional slip ring assembly. A second belt or gear coupling will connect the generator to the power takeoff pulley 33. Details of the generator and slip ring assembly are conventional and will not be described further.

At the front of the channel formed by side panels 18 and 19 of the housing, is a vane member 43 which is connected through two pivot supports 42 to the parallel sloping members 21. The vane member 43 may be deflected in response to movement of the gate 45 to assume a position either occluding the formed channel or for being positioned partially or fully open to receive the maximum wind incident to the windmill. In low wind conditions, the vane acts as a deflector deflecting incident wind at an angle to the paddle assembly 11. The deflected wind strikes the paddles as they are ascending to their power-producing position.

In a preferred embodiment of the present invention, the vane member 43 and lateral sides 18 and 19 have corrugation spaced laterally across their widths and running longitudinally along their lengths. These corrugations aid in keeping the windmill incident to the wind.

The advantage of the movable vane member 43 and the gate 45 can be seen by viewing FIG. 3. FIG. 3 illustrates that when the wind force is great enough to deflect the gate 45, the gate tensions the connecting chain 47 about pulley 46, applying a force for pivoting the vane 43 about its pivot supports 42. This represents a high wind condition for the windmill, wherein the vane 43 permits a retarding air force to be incident to returning paddles of the paddle assembly which is partially shielded by the lateral side panels 18 and 19. The returning paddle of a rotating paddle assembly will then tend to resist the increased force experienced on the fully exposed paddle, thus tending to govern or regulate the rotational speed of the paddle assembly 11.

The effect of the foregoing structure is to assist in moderating the velocity for the paddle assembly experienced under high wind conditions. The gate 45 and vane 43 will cooperate in manner to impose a retarding force on the paddle assembly to prevent an overspeed condition.

The entire windmill structure being supported by the collar 60 will assume the direction of wind with the help of the extensions 54, 55 connected to the frame vertical supports 58, and with the corrugations 52 on the vane member 43 and on the lateral panels 18, 19 shown in FIGS. 1 and 2.

Figure 7:
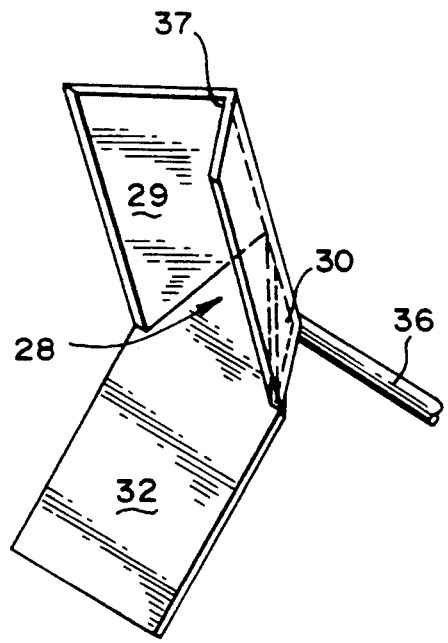
FIG. 7 is another perspective view of the paddle assembly.
Figure 8:
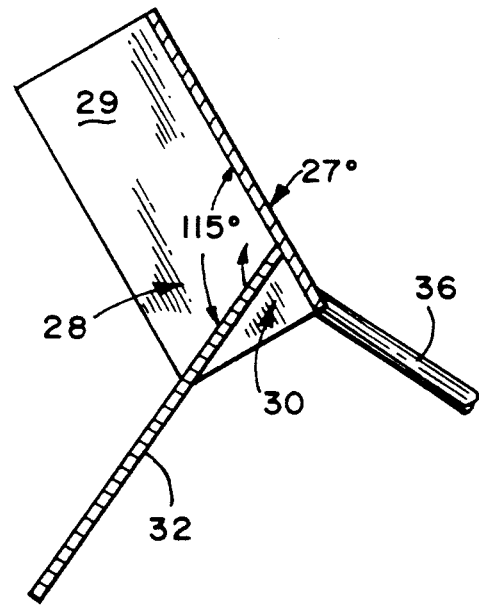
FIG. 8 is a section view of the paddle assembly illustrating the relationship between the plate 32, radial support arm 36 and V-shaped member 29.

The overall efficiency of the windmill structure shown in the foregoing Figures is enhanced by a paddle structure shown in FIGS. 6 through 8. Referring to each of these Figures, there is shown a paddle structure comprising a V-shaped angle member 29 terminated at one end thereof by a planar member 32. As can be seen in these Figures, the planar member 32 forms first and second cavities 28 and 30. The cavity 28 provides a major scoop which will fill with air and provide the major force for the paddle assembly during rotation. The second smaller cavity member 30 will provide added rotational torque to the paddle assembly when a given paddle 27 has reached a point in its rotation where it normally is ineffective. The rear side of the plate member 32 will capture a small amount of wind when in a position when the paddle 27 is normally ineffective in generating torque on the axle 13.

In forming each of the cavities 28 and 30, it can be seen that the optimum relationship between the axis of the radial arm 36 connecting the axle 13 to the paddle is approximately 27°. Further, the major scoop has an angular opening between the center of the V-section and the planar member 32 of approximately 115°. By slightly orienting the back of the V structure with respect to the axis of the radial arm 36, to form an angle between the common joint 37 of the V-shaped member and the radial arm 36 of 27°, the effectiveness for the smaller cavity 30 is optimized.

Thus, wind power is generated as the paddle ascends from the horizontal position through an arc of 120° and beyond as the smaller cavity 30 supplies force from the incident wind. During the remaining portion of travel, the paddle is essentially shielded by the channel structure as well as the pivotal vane 43. The pivotal vane 43 in a low wind condition will force the wind in a direction upward to meet the exiting planar member 32 as it leaves the channel ascending into a wind capture position.

Thus, the device not only provides for improved stability in the rotational speed for the wind turbine, but efficiency in generating wind power is achieved through a unique paddle assembly, which avoids the complicated airfoil designs of earlier attempts at improving the efficiency of windmill devices.

Those skilled in the art will recognize yet other embodiments described more particularly by the claims which follow.

What is claimed is:

1. A power producing windmill comprising:
a frame;

a paddle assembly having a central axle, supported for rotation on said frame supporting a multiplicity of paddles;

two spaced-apart lateral sides connected to said frame forming a channel in which said paddle assembly rotates, said lateral sides partially shielding said paddles during a descending portion and a forward portion of said paddle's rotation;

a substantially horizontally pivoting vane connected at a point on said frame in front of said channel and above a lower rotation arc of said paddle assembly for regulating an amount of air entering said channel; and wind regulating means for regulating rotation of said pivoting vane from a position occluding said channel and directing air into said paddles during their ascent, and to a position exposing substantially all of said channel, thereby regulating the amount of air incident to a portion of said paddle assembly traversing said channel, said wind regulating means being responsive to wind velocity.

2. The windmill of claim 1, wherein said means for regulating said pivoting vane positions said pivoting vane in a position to maintain rotation of said paddle assembly at a substantially constant RPM.

3. The windmill of claim 1 wherein:

said wind regulating means for regulating rotation of said pivoting vane includes a gate pivotally attached to the rear of said channel and held against the rear of said channel by gravitational forces, said gate being deflected by wind passing through said channel; and, means for coupling said gate to said vane for regulating said vane position in response to deflection of said gate.

4. The windmill of claim 3, wherein said gate is connected by a pulley assembly to said vane located at the front of said channel.

5. The windmill of claim 3, wherein said gate is exposed to wind passing through said channel and along either side of said channel.

6. The windmill of claim 5, wherein lateral panels are covered with horizontal corrugations.

7. The windmill of claim 1 further comprising a rotary support for supporting said frame for free rotation in response to changes in wind direction.

8. The windmill of claim 7, wherein said pivotally connected vane includes corrugations on said vane for assisting said windmill to maintain alignment with the wind.

9. The windmill of claim 1, wherein said paddle assembly includes:

a plurality of paddles, each of which comprises a first V-shaped member connected to one end of a radial spoke, said spoke connected at a second end to an axle for rotation; and, a planar member connected at an angle to the inside of said first V-shaped member forming first and second cavities on opposite sides of said planar member.

10. The windmill of claim 9 wherein said radial spoke is connected to said V-shaped member and said planar member at an angle.

11. A power producing windmill comprising:

a frame member supporting an axle for rotation;

a plurality of paddles connected to said axle, each of said paddles comprising:

a radial spoke connected to said axle;

a single V-shaped air scoop connected at a remaining end of said radial spoke, said V-shaped scoop closed at one end by a planar member, forming first and second wind-capturing cavities on each side of said planar member.

12. The power producing windmill of claim 11 wherein said planar member is connected to said V-shaped air scoop at an angle of substantially 115°.

13. The power producing windmill of claim 11 wherein the axis of said radial spoke is at an angle of substantially 27° with respect to a common joint of said V-shaped member.

* * * * *